United States Patent Office.

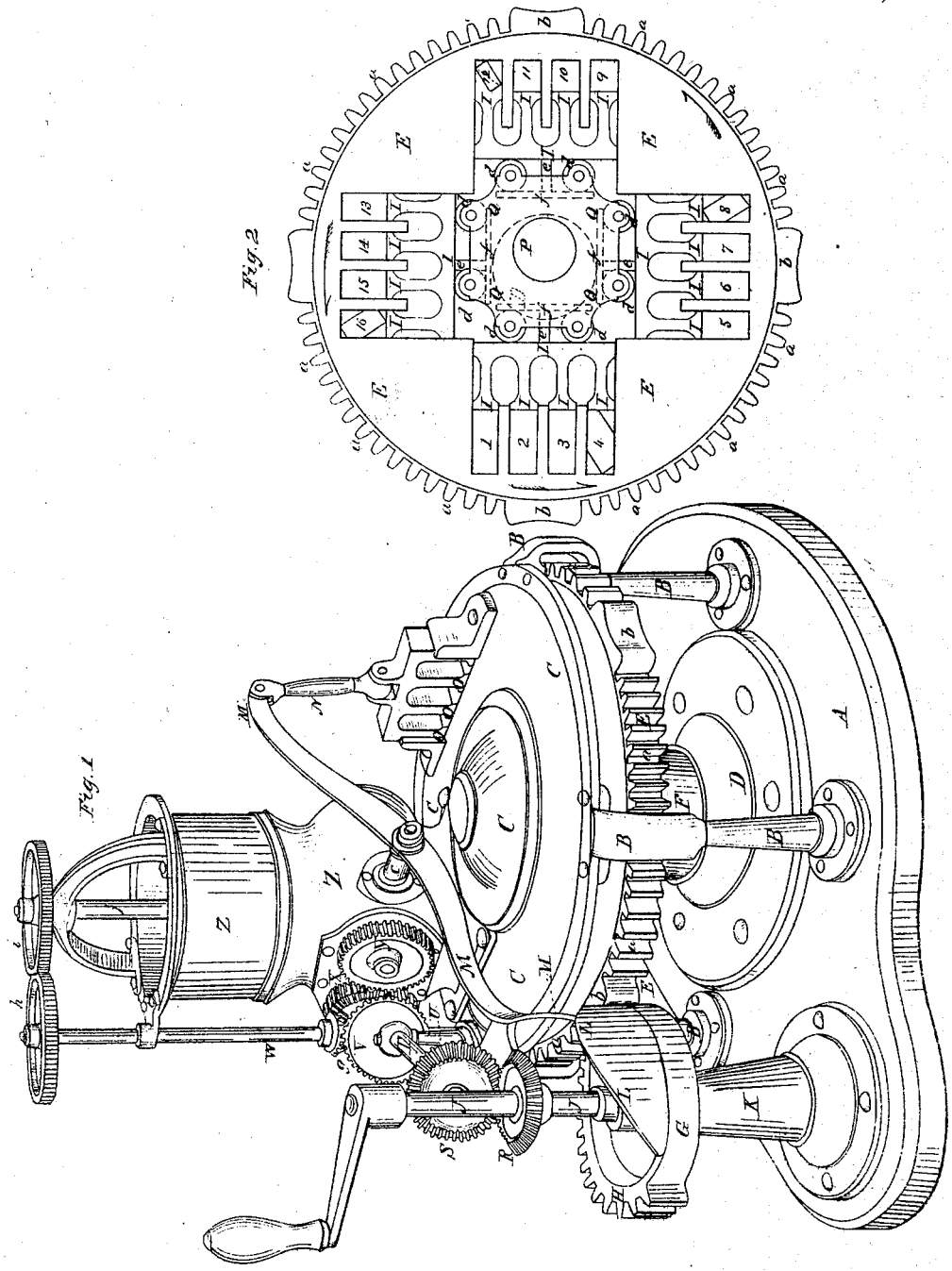

CHARLES D. WRIGHTINGTON, OF FAIRHAVEN, AND BENJAMIN P. RIDER, OF BOSTON, MASSACHUSETTS.

Letters Patent No. 71,939, dated December 10, 1867.

IMPROVED PEAT AND BRICK-MACHINE.

The Schedule referred to in these Letters Patent and making part of the same.

TO ALL WHOM IT MAY CONCERN:

Be it known that we, CHARLES D. WRIGHTINGTON, of Fairhaven, in the county of Bristol, and BENJAMIN P. RIDER, of Boston, in the county of Suffolk, both of the State of Massachusetts, have invented certain new and useful Improvements in Machines for Pressing Peat or Bricks in Moulds; and we do hereby declare the following to be a full, clear, and exact description of the same, reference being had to the accompanying drawings, making a part of this specification, in which—

Figure 1 represents a perspective view of the machine, and

Figure 2 represents a top plan of the moulding-wheel and some of its connected parts.

Our invention consists, first, in the construction and operation of the revolving bed or wheel containing the series of moulds, and the revolving frames of followers working eccentrically therewith whilst rotating.

And our invention further consists in the mechanism by which the mould-wheel or bed is intermittently stopped and held immovable, whilst the plungers operate to force out the pressed bricks from the moulds, said stopping and holding-device being automatic in their action, and not requiring the attention of the operator.

To enable others skilled in the art to make and use our invention, we will proceed to describe the same with reference to the drawings.

A substantial bed, A, is first provided for supporting the machine, as follows: Columns, B B, &c., are united to the bed and hold up the plate C, which is of course immovable. At a central position upon the bed or base A there is a column or shaft, D, upon which the mould-wheel E is supported and turned or rotated; and that said wheel may have a firm, substantial support or bearing on said central shaft or column D, a long hub, F, attached to the wheel, sets over or on to said column. The mould-wheel E is furnished with four series of moulds, 1 2 3 4, 5 6 7 8, 9 10 11 12, and 13 14 15 16, the series being arranged diametrically opposite and at right angles to each other, or each series occupying a quadrant of the whole circle of the wheel. These moulds are of the shape, form, size, and capacity of the brick or block that is to be formed in them, and they may be rectangular in form, as shown by the black lines, or triangular, as shown by the red lines in fig. 2 at 4, 8, 12, and 16, which triangular-shaped moulds have the advantage of releasing a side and end of the pressed brick when the follower is withdrawn, and thus makes it much more easily forced out of the mould. When the moulds are rectangular, and the follower is withdrawn, there is but one side of the pressed brick released, the other three sides clinging to the mould, and it requires much force to remove it, so much so as to often spoil the brick. In pressing peat for fuel it is not so important that the form of the block or brick should be preserved, but an easy delivery of the pressed block is quite important. When the triangular moulds are used, one half of the die or form is made in the follower I, and the other half in the mould, each die being of the form of the two parts of a brick divided diagonally from the extreme corners.

The mould-wheel E has upon its perimeter a series of cogs, $a\ a\ a$, &c., intercepted by a series of abutments, blanks, or stops, $b\ b\ b\ b$, the faces of which stops are concave and in the arc of a circle, corresponding to the blank portion G of the drive-wheel H. The drive-wheel H is arranged upon a vertical shaft, J, which is supported in a column, K, and motion may be communicated to this drive-wheel and shaft by any first-moving power. The cogs of the drive-wheel H take into those, $a$, of the mould-wheel E, and cause the latter to move around until the blank portion G comes to or against the abutments or stops $b$ of the mould-wheel, and the mould-wheel is stationary so long as these two parts are in contact with each other, and the perimeter G, taking and moving against the concave portion $b$ of the mould-wheel, locks the mould-wheel and prevents it from moving, whilst the motion of the drive-wheel is continuous. Of course these blanks upon the two wheels are so disposed and arranged as that the motion and cessation of motion of the mould-wheel shall be timed to suit the other operations of the machine, and more especially of the cam or eccentric motion that works the plungers I. On that portion of the drive-wheel immediately over and around the blank portion G, there is a cam, L, which raises up the end of a lever, M, that is pivoted at $c$ at or near its centre, and which, raising up at that end, correspondingly lowers it at the opposite end, and after the cam L has passed from under the lever M, the lever is returned to its former position by the reaction of a spring of any suitable kind. To that end of the lever M most remote from the cam L there is connected by a link, N, the series of followers or pushers O, which force the pressed bricks or blocks out of the moulds, from whence they may be removed in any of the usual well-known ways to the place where they are dried or seasoned. On the upper end of the shaft D of the mould-wheel E there is a journal, P, that is eccentric to the shaft and mould-wheel, and upon this eccentric-journal is placed a frame, Q, that partakes of the eccentric motion of the journal, and moves it to and from each of the series of moulds. The frame Q is four-sided, with the corners cut away, to allow for the movement of the mould-wheel. Upon each of the four sides of the frame are arranged a pair of friction-rolls, d d, and each of the series of plungers I is connected to this frame Q by straps, rods, or bars, e f, so that said frame shall not only force the plungers I into or towards the moulds, but also retract the plungers after the material has been compressed into the mould. The plungers moving against the rolls d d, prevents undue friction between them. Upon the driving-shaft J there is a bevel-gear, R, that takes into and turns a similar bevel-gear, S, upon the shaft T, supported in the column U. Upon the opposite end of the shaft T there is a bevel-wheel, V, that takes into and turns a bevel-pinion, g, on the vertical shaft W, and thus gives motion to said shaft. The pinion g gears into a wheel, X, which in turn meshes with the gear Y, so that both of the wheels X Y shall turn towards each other. The wheels X and Y are arranged upon the ends of shafts that pass through the lower portion of the clay or peat-hopper Z, and these shafts have blades upon them, which, turning towards each other, separate from the mass a portion, which is forced down into the moulds and fills them completely. On the upper end of the shaft W there is a gear, h, that works into a gear, i, on the end of a vertical shaft, j, that passes down into the clay-hopper Z, and upon this shaft are projecting arms that revolve between other stationary arms fixed spirally in said hopper, for thoroughly mixing the material, and tempering it preparatory to its being carried down into the moulds.

The mould-wheel must be momentarily stopped to allow the pressed bricks or blocks to be pushed out of the moulds. Whilst this is being done to one set of moulds, the set preceding them is under the hopper, receiving their charge. When the filled moulds have moved a quarter revolution of the entire circuit of the mould-wheel, the first series of plungers begin to act upon the material and partially compress it into its ultimate form. At the next quarter revolution the whole "throw" of the eccentric-journal is upon the followers, and the pressing is completed. By the time that the next quarter revolution is made, the plungers have been retracted from the mould, and the pushers O descend and force the pressed bricks or blocks out of the moulds, and at the next or last quarter revolution the moulds are again under the hopper and receive a new charge, and the operation is repeated and continued, the mould-wheel moving in the direction of the arrows, as shown in fig. 2.

Having thus fully described our invention, what we claim therein as new, and desire to secure by Letters Patent, is—

1. In combination with the mould-wheel having the series or sets of moulds in it, a series of plungers revolving with said wheel, and operated in succession by the eccentric-journal and frame Q, substantially as and for the purpose described.

2. We also claim, in combination with a mould-wheel having a series of cogs, interposed by a series of concave stops, blanks, or abutments upon its periphery, a drive-wheel, having cogs and a blank surface on its perimeter, so that the mould-wheel may be moved, stopped, and locked by said drive-wheel, which has a continuous movement, substantially as and for the purpose described.

3. We also claim the location and arrangement of the cam over and around the blank on the perimeter of the drive-wheel, so that whilst the mould-wheel is stopped and locked by said drive-wheel, which continues its movement, said drive-wheel shall operate the pushers to discharge the pressed bricks or blocks from the moulds, substantially as described.

CHARLES D. WRIGHTINGTON,
BENJAMIN P. RIDER.

Witnesses.
 A. B. STOUGHTON,
 EDM. F. BROWN.